United States Patent
Wiens et al.

(10) Patent No.: US 11,580,853 B2
(45) Date of Patent: Feb. 14, 2023

(54) METHOD FOR ACQUIRING THE SURROUNDING ENVIRONMENT AND SYSTEM FOR ACQUIRING THE SURROUNDING ENVIRONMENT FOR A MOTOR VEHICLE

(71) Applicant: Robert Bosch GmbH, Stuttgart (DE)

(72) Inventors: Alex Wiens, Stuttgart (DE); Dominik Widmann, Leinfelden-Echterdingen (DE); Michael Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 943 days.

(21) Appl. No.: 16/379,384

(22) Filed: Apr. 9, 2019

(65) Prior Publication Data
US 2019/0318623 A1 Oct. 17, 2019

(30) Foreign Application Priority Data
Apr. 13, 2018 (DE) .......................... 102018205661.7

(51) Int. Cl.
*G08G 1/09* (2006.01)
*G08G 1/0965* (2006.01)
(Continued)

(52) U.S. Cl.
CPC ........... *G08G 1/0965* (2013.01); *B60Q 5/005* (2013.01); *B60W 10/18* (2013.01); *B60W 10/20* (2013.01);
(Continued)

(58) Field of Classification Search
CPC ...... G01S 7/5273; G01S 15/931; G01S 15/08; G01S 7/539; G08G 1/0965; B60Q 5/005; B60W 10/20; B60W 10/18
See application file for complete search history.

(56) References Cited

U.S. PATENT DOCUMENTS

| 5,610,815 A * | 3/1997 | Gudat | G05D 1/028 |
| | | | 73/178 R |
| 2003/0071735 A1* | 4/2003 | Hanson | A01M 29/16 |
| | | | 340/573.2 |

(Continued)

FOREIGN PATENT DOCUMENTS

DE 10 2006 043 995 A1 3/2008
DE 102008026091 A1 * 12/2009 .............. G01P 3/48
(Continued)

OTHER PUBLICATIONS

DE-102011087839-A1 translation (Year: 2022).*
DE-102008026091-A1 (Year: 2022).*

*Primary Examiner* — Daniel L Murphy
*Assistant Examiner* — Amie M Ndure
(74) *Attorney, Agent, or Firm* — Norton Rose Fulbright US LLP; Gerard Messina

(57) ABSTRACT

A method for acquiring the surrounding environment of a motor vehicle. The motor vehicle has at least one ultrasound sensor. The ultrasound sensor includes an ultrasound transducer for sending, the ultrasound sensor receiving acoustic environmental signals, in particular audible environmental signals, in that the ultrasound sensor is controlled in its evaluation in such a way that sound waves having frequencies below a resonant frequency of the ultrasound transducer, in particular audible sound waves, of an environmental signal are acquired and evaluated. Environmental signals are understood as acoustic signals that are not produced by the ultrasound transducer itself, but rather by an external sound source that in particular differs from the motor vehicle. This can be for example the siren of a rescue vehicle or emergency vehicle, or the horn of some other motor vehicle.

16 Claims, 3 Drawing Sheets

(51) Int. Cl.
    *G01S 15/08*        (2006.01)
    *G01S 7/527*        (2006.01)
    *B60W 10/18*        (2012.01)
    *B60Q 5/00*         (2006.01)
    *B60W 10/20*        (2006.01)
    *G01S 15/931*       (2020.01)
(52) U.S. Cl.
    CPC ............ *G01S 7/5273* (2013.01); *G01S 15/08*
                     (2013.01); *G01S 15/931* (2013.01)

(56) References Cited

U.S. PATENT DOCUMENTS

| | | | | |
|---|---|---|---|---|
| 2005/0058021 | A1* | 3/2005 | Feintuch | G01S 15/04 |
| | | | | 367/99 |
| 2007/0075919 | A1* | 4/2007 | Breed | B60R 21/0132 |
| | | | | 345/8 |
| 2008/0239876 | A1* | 10/2008 | Norris | G08B 15/00 |
| | | | | 367/139 |
| 2009/0046538 | A1* | 2/2009 | Breed | G08B 13/248 |
| | | | | 706/20 |
| 2011/0003614 | A1 | 1/2011 | Langereis et al. | |
| 2019/0154439 | A1* | 5/2019 | Binder | G01S 13/878 |

FOREIGN PATENT DOCUMENTS

| | | | | |
|---|---|---|---|---|
| DE | 10 2011 007 777 A1 | 10/2012 | | |
| DE | 102011087839 A1 * | 6/2013 | ............ | F16D 71/04 |
| DE | 102011087839 A1 | 6/2013 | | |

\* cited by examiner

Stand der Technik

METHOD FOR ACQUIRING THE SURROUNDING ENVIRONMENT AND SYSTEM FOR ACQUIRING THE SURROUNDING ENVIRONMENT FOR A MOTOR VEHICLE

RELATED APPLICATION INFORMATION

The present application claims priority to and the benefit of German patent application no. 10 2018 205 661.7, which was filed in Germany on Apr. 13, 2018, the disclosure of which is incorporated herein by reference.

FIELD OF THE INVENTION

The present invention relates to a system for acquiring the surrounding environment for a motor vehicle, configured to acquire acoustic signals in roadway traffic, in particular to acquire a warning signal, for example of a rescue vehicle.

BACKGROUND INFORMATION

Patent document DE 10 2006 043 995 A1 discusses a device for scaring off animals (e.g. martens) for motor vehicle. Here, for example ultrasound transducers are used as transmitters to scare off the martens or other animals. The acquisition of the presence of animals is explicitly described as done using a microphone, realized as a microphone separate from the ultrasound transducer.

Patent document DE 10 2011 007 777 A1 discusses a method for recognizing a rescue vehicle that is approaching a motor vehicle and that emits a specific sound. The specific sound may have ultrasound components. The surrounding environment of the motor vehicle is monitored with regard to external sound, and an evaluation is made of the external sound recognized by the monitoring in order to recognize the sound specific to the rescue vehicle, and, if warranted, a display is provided inside the motor vehicle indicating that a sound specific to the rescue vehicle has been recognized.

SUMMARY OF THE INVENTION

According to the present invention, a method is proposed for acquiring the surrounding environment of a motor vehicle. For this purpose, the motor vehicle has at least one ultrasound sensor. The ultrasound sensor includes an ultrasound transducer for sending and receiving acoustic signals whose resonant frequency is in the ultrasound range, for example approximately 45 kHz. According to the present invention, the ultrasound sensor receives acoustic environmental signals, in particular audible environmental signals, in that the ultrasound sensor is controlled in its evaluation in such a way that sound waves having frequencies below a resonant frequency of the ultrasound transducer, in particular audible sound waves, of an environmental signal are acquired and evaluated. Here, environmental signals are understood as acoustic signals that are not produced by the ultrasound transducer itself, but that originate from an external sound source that in particular differs from the motor vehicle. This may be for example the siren of a rescue vehicle or emergency vehicle or the horn of some other motor vehicle. The frequency range of sound waves generally audible for human beings is indicated in the literature as being from approximately 20 Hz to approximately 20 kHz. The ultrasound sensor may be controlled in its evaluation in such a way that sound waves having frequencies within this frequency range of an environmental signal are acquired and evaluated.

However, the sound-based environmental acquisition enabled by the present invention goes beyond a simple detection of sirens and their localization: all traffic participants emit sound, in particular audible sound. Perceiving this sound, as enabled by the present invention, makes it possible to collect information about the surrounding environment that for example can be fused with radar and video data that are also acquired, so that object tracking around the home vehicle is improved. This results in further advantages. For example, a detection is enabled of objects and events (sound sources) that are hidden from radar and video. Radar-based and video-based measurements use an open field of view, while sound sensors of an environmental acquisition according to the present invention are capable of hearing "around the corner." Moreover, a classification of sound-emitting objects can take place for example based on their emitted sound waves. For this purpose, for example vehicle noises such as noises of engines, brakes, tires, and/or the characteristic release of pressure in trucks and buses can be acquired. Associated with this, additional information about the surrounding environment can also be inferred, for example concerning the state of the roadway surface, based on the driving noises of other vehicles. This information may then be used for example to estimate a friction coefficient.

The received environmental signals may be evaluated using a filtering function adapted to an expected frequency range of an environmental signal. Thus, for example it is known that the sirens of rescue vehicles in Germany have frequencies between approximately 360 and 630 Hz. These frequencies may exhibit a Doppler shift depending on the relative speed. Therefore, in a particular embodiment, the filtering function includes at least one bandpass for frequencies in an expected range. This can include for example the frequencies from 300 to 700 Hz. Further frequency bands are additionally or alternatively conceivable. Alternatively, the bandpass may also cover a large part of all frequencies of the audible spectrum, e.g. frequencies from 20 Hz to 20 kHz. For example, two or more different bandpasses may also be used. The filtering function may be realized as a hardware component or as a software component. In order to enable further classification and differentiation of a received environmental signal, and thus for example to enable unambiguous recognition of a siren signal of an emergency vehicle or an accident scenario, or to enable better tracking of a sound-emitting object, further signal properties such as an amplitude, the amplitude curve and/or the frequency curve, and/or a phase or a phase curve of the environmental signal can also be evaluated.

In an exemplary embodiment of the present invention, the environmental signal is acquired by at least two ultrasound sensors of the motor vehicle. This enables for example a plausibilization of the measurement results through comparison of the received environmental signals. Given the use of at least two ultrasound sensors the environmental signals can be evaluated in such a way that an item of information can be ascertained concerning the position and/or the speed and/or the acceleration and/or the type and/or a spatial orientation and/or a spatial extension (e.g. using fusion algorithms) of a source of the acquired environmental signal relative to the motor vehicle. If two ultrasound sensors are used, for example through the comparison of the acquired amplitudes and/or phases an item of information can be derived indicating which ultrasound sensor is closer to the source of the environmental signal. Given the use of three or more ultrasound sensors whose installation positions are known, still more precise information can be obtained, for example using known methods of trilateration or triangulation, concerning the relative position and the spatial extension of the source of the acquired environmental signal relative to the motor vehicle.

According to the present invention, it is accordingly proposed to control the ultrasound transducers provided in the motor vehicle, e.g. in the bumper area, which are for example part of a parking assistance system, in their evaluation of reflected sound waves in such a way that sound waves that also occur below the typical ultrasound frequency range, i.e. in particular audible sound waves, can be acquired and processed. The present invention is based on the recognition that although such ultrasound transducers are not suitable for use as "good" microphones for audible sound waves, in some cases particular noises, such as sirens of rescue vehicles, are nonetheless detectable by them and thus usable for example for driving operation. In this way, acoustic environmental signals that are also in the audible range can advantageously be received and evaluated without requiring an additional sensor system.

In this way a warning signal can be produced, for example as a result of the evaluation of an environmental signal.

The warning signal can be outputted acoustically and/or optically and/or haptically, in particular to a driver of the motor vehicle. For this purpose, the motor vehicle may have corresponding loudspeakers and/or optical display elements and/or haptic elements in its passenger compartment that can output a warning signal to the driver when an environmental signal is acquired. In this way, it is ensured that the driver can react to the environmental signal even if the driver does not personally hear it, e.g. because the volume level of an audio system of the vehicle, e.g. of the radio or of the hands-free system, is so high that the environmental signal is drowned out for the driver's hearing by the audio system of the motor vehicle.

If, through the use of two or more ultrasound sensors, an item of information concerning the position of a source of the acquired environmental signal relative to the motor vehicle has additionally been acquired, then the output of the warning signal can take place in such a way that the information about the position of a source of the acquired environmental signal is included in the output. In the case of an acoustic output of the warning signal, this can for example take place through various loudspeakers in the interior of the vehicle. The warning signal is for example outputted by the loudspeakers that correspond to the direction of the source of the environmental signal. In this way, the driver can intuitively perceive where the source is located relative to the motor vehicle. Alternatively or in addition, for example a visual display can also be provided symbolically showing an item of information concerning the position of the source of the environmental signal relative to the motor vehicle.

In an exemplary embodiment of the present invention, as a function of the evaluation of an environmental signal and/or of the production of a warning signal an automatic driving maneuver can be initiated, in particular a braking maneuver and/or a steering maneuver. In this way, for example when a rescue vehicle or an emergency vehicle is recognized through acquisition of the siren as environmental signal, the motor vehicle can be moved to the edge of the roadway in order to enable a rescue corridor. For this purpose, the motor vehicle must be configured to carry out certain driving maneuvers at least partly autonomously.

Alternatively or in addition, it can be provided that the warning signal triggers a change of a current vehicle parameter, in particular the volume level of an audio system of the motor vehicle. The current volume level is for example reduced. In this way, the driver's attention can be additionally drawn to the environmental signal, in particular when an emergency vehicle has been recognized through acquisition of the siren as environmental signal.

According to a further aspect of the present invention, an environmental acquisition system is proposed for a motor vehicle that includes a computing unit and at least one ultrasound sensor that has an ultrasound transducer. The ultrasound transducer is configured to receive acoustic signals, and the ultrasound transducer is operated in such a way that the ultrasound transducer sends out ultrasound signals and receives echo signals reflected by objects. The computing unit determines items of environmental information from the received echo signals. According to the present invention, it is in addition provided that the ultrasound sensor receives acoustic environmental signals, in particular audible environmental signals, in that the ultrasound sensor is controlled in its evaluation in such a way that sound waves having frequencies below a resonant frequency of the ultrasound transducer, in particular audible sound waves, of an environmental signal are acquired and evaluated.

For this purpose, the ultrasound sensor may have at least two operating states, such that in a first operating state the ultrasound transducer is operated in such a way that the ultrasound transducer sends out ultrasound signals and receives echo signals reflected by objects, and the computing unit determines items of environmental information from the received echo signals. This corresponds to the standard operating state of an ultrasound sensor that determines distances from objects in the environment surrounding the vehicle for example as part of a parking and maneuver assistance system. The distances are determined for example using the known pulse-echo method. This first operating state may be active, or can be activated by the driver, at low vehicle speeds of approximately 10 km/h and below, in particular in a parking or maneuvering situation. According to the present invention, the ultrasound sensor has a second operating state in which the ultrasound sensor receives acoustic environmental signals, in particular audible environmental signals, in that the ultrasound sensor is controlled in its evaluation in such a way that sound waves having frequencies below a resonant frequency of the ultrasound transducer, in particular audible sound waves, of an environmental signal are acquired and evaluated. The ultrasound sensor can also for example be operated in an alternating manner in the first and second operating state, so that for example in a traffic jam situation both a distance measurement and also an acquisition of acoustic environmental signals can take place.

This may take place in that the computing unit evaluates the environmental signal by filtering the received environmental signals using a filtering function adapted to an expected frequency range of the environmental signal, the filtering function in particular having a bandpass for audible frequencies, for example in a range from 300 to 700 Hz. This bandpass can for example be active only in the second operating state or can be active in both operating states. The filtering function can be realized as a hardware component or as a software component.

The environmental acquisition system may be configured to produce a warning signal as a function of the evaluation of an environmental signal.

The environmental acquisition system also may include an output unit that is configured to output the warning signal, in particular to a driver of the motor vehicle.

Moreover, through the warning signal and/or as a function of the evaluation of the environmental signal, which may be an automatic maneuver of the motor vehicle can be triggered, in particular a braking maneuver and/or a steering maneuver.

In the following description of the exemplary embodiments of the present invention, identical elements are designated with identical reference characters, and repeated description of these elements may be omitted. The Figures represent the subject matter of the present invention merely schematically.

DETAILED DESCRIPTION

Figure 1:
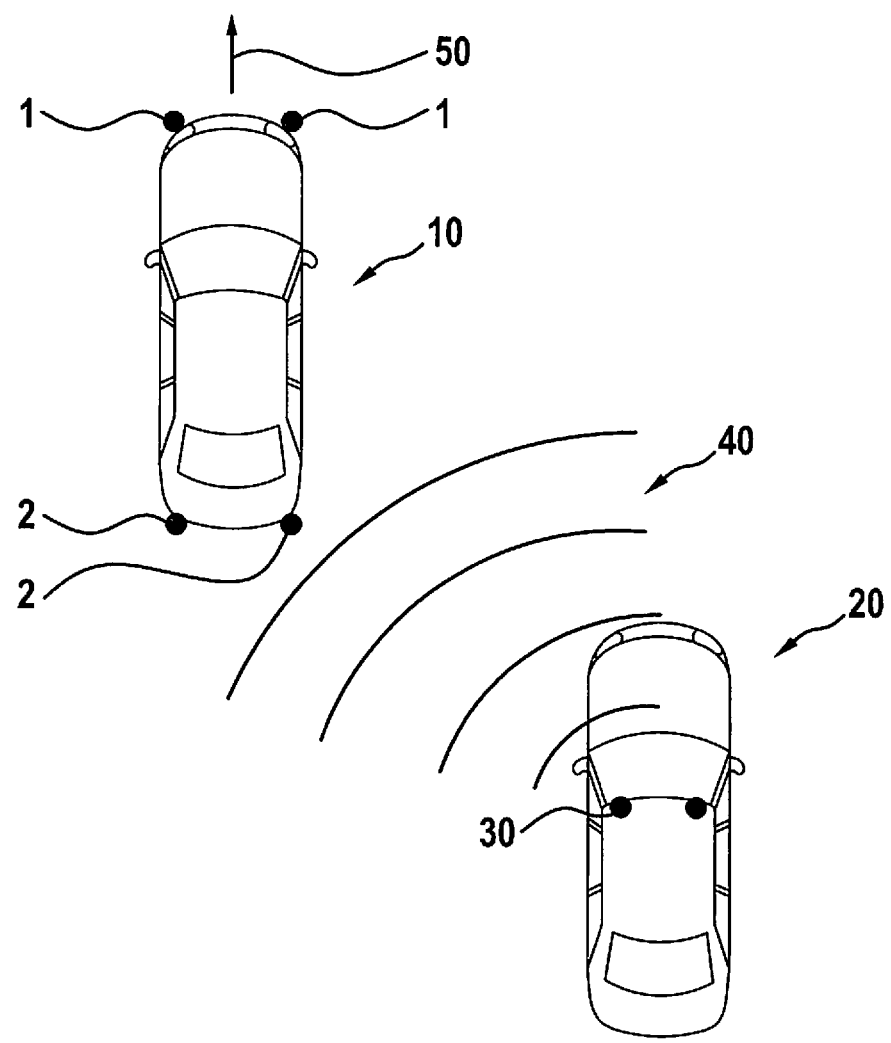
FIG. 1 shows a driving situation in which a method according to an exemplary embodiment of the present invention is used.

FIG. 1 shows an example of a driving situation in which a method according to an exemplary embodiment of the present invention is advantageously used. A motor vehicle 10 is moving on a roadway, for example a highway. Motor vehicle 10 is traveling forward, as indicated by arrow 50, with a certain speed. In this example, the vehicle has four ultrasound sensors 1, 2 that have associated ultrasound transducers that are part of a parking and maneuvering assistance system. Two ultrasound sensors 1 are situated on a front bumper of motor vehicle 10.

Two ultrasound sensors 2 are situated on a rear bumper of motor vehicle 10. Ultrasound sensors 1, 2 are placed in such a way that they are essentially situated at the four corners of the vehicle. In alternative embodiments, more ultrasound sensors may also be provided, e.g. four ultrasound sensors per bumper.

Ultrasound sensors 1, 2 are part of an environmental acquisition system. Each of the ultrasound sensors 1, 2 has an ultrasound transducer. Each ultrasound transducer is configured to produce acoustic signals in the ultrasound frequency range and to send them into the surrounding environment of motor vehicle 10. These signals can be reflected by objects in the environment surrounding motor vehicle 10. The reflected signals can in turn be received by ultrasound transducers of ultrasound sensors 1, 2. Distances from the objects in the surrounding environment of motor vehicle 10 can be determined in a known manner via the signal runtimes (pulse-echo method). This measurement operation corresponds to the first operating state of an environmental acquisition system according to the present invention and is standardly active only at low speeds of for example 10 km/h or lower.

In the situation shown in FIG. 1, motor vehicle 10 is moving at a significantly higher speed, for example more than 80 km/h. Ultrasound sensors 1, 2 are therefore operated in a second operating state in which the ultrasound transducers of ultrasound sensors 1, 2 can receive acoustic environmental signals, in particular audible environmental signals. For this purpose, the ultrasound transducers of ultrasound sensors 1, 2 are each controlled in such a way that sound waves having frequencies below a resonant frequency of the respective ultrasound transducer, in particular audible sound waves, of an environmental signal are also acquired and evaluated.

In the situation shown in FIG. 1, an emergency vehicle 20, for example a police vehicle or a rescue vehicle, is approaching motor vehicle 10 from the right rear. Emergency vehicle 20 has a signal system as sound source 30, having a siren that produces an acoustic signal 40. Acoustic signal 40 is a signal audible to human hearing, in a frequency range of for example 300 to 700 Hz. It is used in a known manner to make human drivers of vehicles in the environment surrounding emergency vehicle 20 aware of the emergency situation.

The ultrasound transducers of ultrasound sensors 1, 2 of motor vehicle 10 receive acoustic signal 40, and ultrasound sensors 1, 2 are controlled according to the present invention in such a way that the sound waves of signal 40 are also acquired and evaluated. This takes place for example using a filtering function adapted to an expected frequency range of an environmental signal. Thus, motor vehicle 10 can recognize that when a signal 40 is acquired an emergency vehicle 20 is situated in its surrounding environment. From this further actions can be derived, such as the production and display of a warning signal for the driver of motor vehicle 10, and/or the introduction of an automatic driving maneuver, in particular a braking maneuver and/or a steering maneuver, in order for example to form a rescue corridor, and/or a change in a current vehicle parameter of motor vehicle 10, e.g. an adjustment of the volume level of an audio system of motor vehicle 10.

Because emergency vehicle 20 is approaching motor vehicle 10 from the rear, rear ultrasound sensors 2 may receive acoustic signal 40. By comparing the received data, for example the signal amplitudes and/or runtime differences, it can in addition be recognized that emergency vehicle 20 is approaching from the rear right. This information concerning the position of emergency vehicle 20 as source of the acquired environmental signal can also be outputted to the driver, and/or can be taken into account in the introduction of an automatic vehicle maneuver.

Figure 2A:
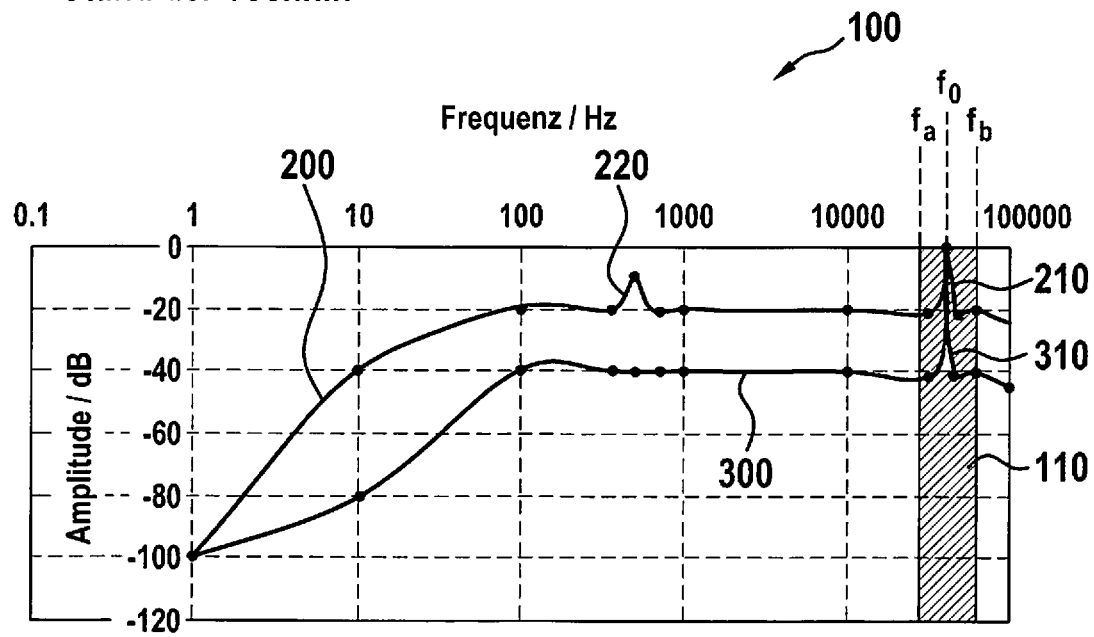
FIG. 2a shows a diagram of ultrasound signals and environmental signals received and filtered by an ultrasound sensor according to the existing art.

FIG. 2a) shows, as an example, a diagram 100 of signals received and filtered by an ultrasound sensor according to the existing art. On the x axis, the frequency in Hz is plotted. The signal amplitude in dB is plotted on the y axis. The curve 200 represents the detected signal spectrum. In the example shown, curve 200 has an ultrasound signal 210 that for example is an echo signal of an ultrasound signal previously sent out by the ultrasound sensor. In addition, curve 200 has an environmental signal 220 in an audible range of the sound spectrum. In the filtering of the detected signal spectrum 200 according to the existing art, audible frequencies are suppressed. There results a filtered spectrum 300 that then still has only ultrasound signal 310. For this purpose, standardly a bandpass 110 for ultrasound frequencies is used. The bandpass can for example let through frequencies $f_a$ to $f_b$, a resonant frequency or operating frequency $f_0$ of the ultrasound sensor being situated inside bandpass 110 in this example. Resonant frequency $f_0$ can for example be 45 kHz. For example, $f_a$=40 kHz and $f_b$=56 kHz. Of course, other frequency values are conceivable.

Figure 2B:
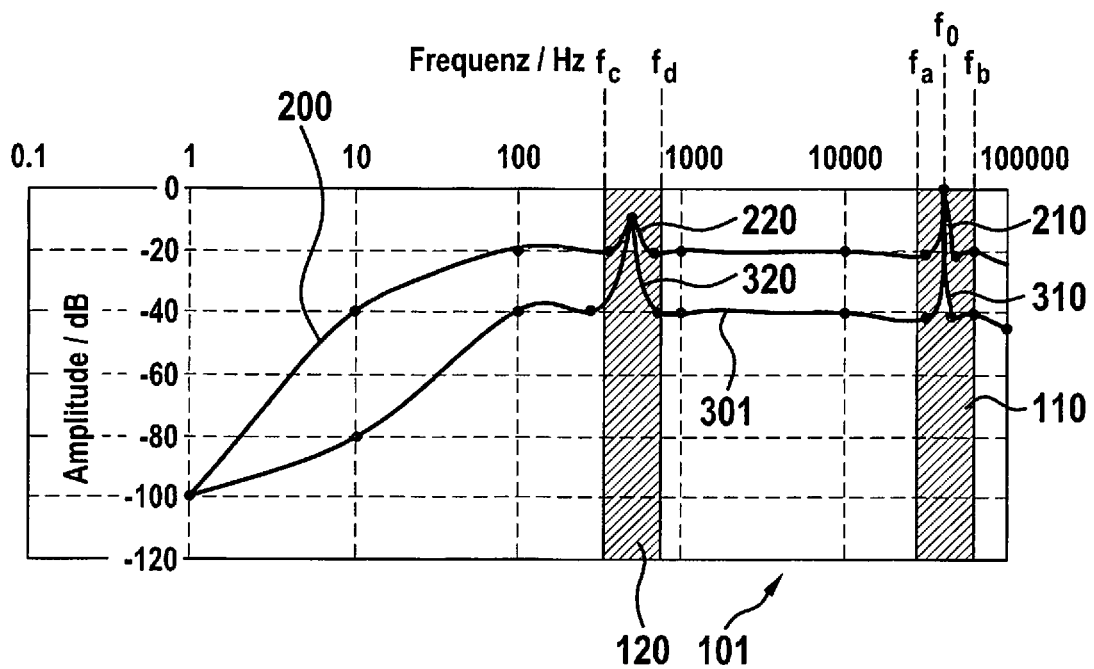
FIG. 2b shows a diagram of ultrasound signals and environmental signals received and filtered by an ultrasound sensor according to a possible embodiment of the present invention.

FIG. 2b) schematically shows, as an example, a diagram 101 of signals received and filtered by an ultrasound sensor according to an exemplary embodiment of the present invention. The frequency in Hz is again plotted on the x axis. The signal amplitude in dB is plotted on the y axis. Curve 200 again represents the detected signal spectrum. This spectrum has an ultrasound signal 200, and also has an environmental signal 220 in an audible range of the sound spectrum. In the filtering of the detected signal spectrum 200 according to this exemplary embodiment of the present invention, audible frequencies are not suppressed, at least in a particular frequency band 120. The filtering of signal spectrum 200 is done by first bandpass 110 at frequencies $f_a$ through $f_b$, a resonant frequency or operating frequency $f_0$ of the ultrasound sensor being situated within bandpass 110 in this example. The resonant frequency $f_0$ can be for example 45 kHz. In the example shown, $f_a$=40 kHz and $f_b$=56 kHz. In a first operating state of a system for acquiring the surrounding environment for a motor vehicle 10 realized according to a possible embodiment of the present invention, bandpass 110 is used to acquire reflected ultrasound signals, e.g. for a distance measurement according to the pulse-echo principle. In addition, a second bandpass 120 at frequencies $f_c$ through $f_d$ is provided, frequencies $f_c$ and $f_d$ being frequencies in a range generally audible for human beings. The frequency range generally audible for human beings is indicated in the literature as being from 20 Hz to 20 kHz. In this example, $f_c$=300 Hz and $f_d$=700 Hz. In a second operating state of a system for acquiring the surrounding environment for a motor vehicle 10 realized according to a possible embodiment of the present invention, bandpass 120 is used to acquire audible environmental signals, such as siren signals of a rescue vehicle or some other emergency vehicle. There results a filtered spectrum 301 that then still has, in addition to ultrasound signal 310, only audible environmental signal 320. It is possible that in the first operating state only first bandpass 110 is active and in the second operating state only second bandpass 120 is active. Alternatively, it is possible for both bandpasses 110 and 120 to be active at all times.

Figure 3:
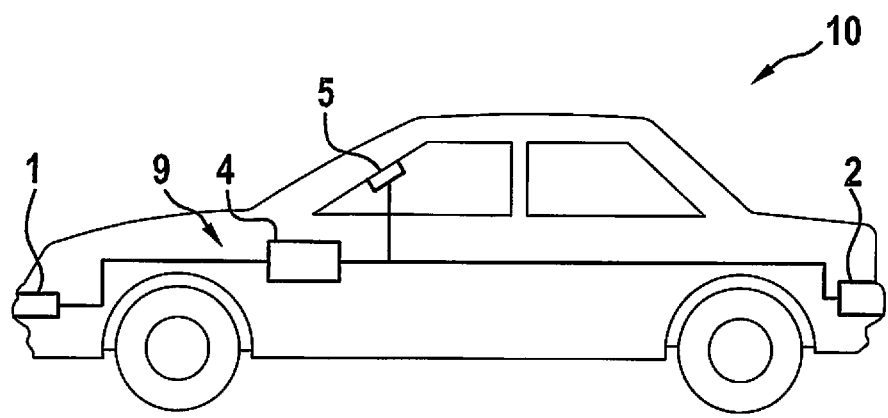
FIG. 3 shows a motor vehicle having a system for acquiring the surrounding environment according to an exemplary embodiment of the present invention.

FIG. 3 schematically shows a motor vehicle 10 having a system for acquiring the surrounding environment 9 according to an exemplary embodiment of the present invention. Environmental acquisition system 9 has a plurality of ultrasound sensors 1 and 2, at least one ultrasound sensor 1 being situated on a front bumper of motor vehicle 10 and at least one ultrasound sensor 2 being situated on a rear bumper of motor vehicle 10. Environmental acquisition system 9 also has a computing unit 4 for evaluating received signals. The computing unit can produce a warning signal as a function of the evaluation of an environmental signal. In addition, environmental acquisition system 9 includes a display unit 5 in the interior of motor vehicle 10 that is configured to output the warning signal to the driver acoustically and/or optically and/or haptically. Display unit 5 can include one or more loudspeakers and/or LEDs and/or a display and/or vibrators for haptic output for this purpose. Computing unit 4 can in addition be configured to trigger an automatic vehicle maneuver, in particular a braking maneuver and/or a steering maneuver, and/or a change of a current vehicle parameter, in particular the volume level of an audio system of motor vehicle 10, as a function of the evaluation of an environmental signal and/or of the production of a warning signal.

What is claimed is:

1. A method for acquiring a surrounding environment of a motor vehicle, the motor vehicle including at least one ultrasound sensor having an ultrasound transducer, the method comprising:
   receiving, via the at least one ultrasound sensor, at least one of acoustic or audible environmental signals; and
   controlling the at least one ultrasound sensor in its evaluation so that at least one of sound waves or audible sound waves having frequencies below a resonant frequency of the ultrasound transducer of an environmental signal are acquired and evaluated,
   wherein as a function of the at least one of sound waves or audible sound waves having frequencies below the resonant frequency of the ultrasound transducer, at least one of a braking maneuver, a steering maneuver, or a change in a volume level of an audio system of the motor vehicle is triggered.

2. The method of claim 1, wherein the received environmental signals are evaluated using a filtering function adapted to an expected frequency range of the environmental signal.

3. The method of claim 2, wherein the filtering function has at least one bandpass, in particular for frequencies in a range from 300 to 700 Hz.

4. The method of claim 1, wherein the environmental signal is acquired by at least two ultrasound sensors of the motor vehicle.

5. The method of claim 4, wherein the environmental signal acquired by the at least two ultrasound sensors is evaluated so that an item of information is ascertained concerning a position and/or a speed and/or an acceleration and/or a type and/or a spatial orientation and/or a spatial extension of a source of the acquired environmental signal relative to the motor vehicle.

6. The method of claim 1, wherein a warning signal is produced as a function of the evaluation of the environmental signal.

7. The method of claim 6, wherein the warning signal is outputted acoustically and/or optically and/or haptically, in particular to a driver of the motor vehicle.

8. The method of claim 7, wherein the environmental signal is acquired by at least two ultrasound sensors of the motor vehicle and is evaluated so that an item of information is ascertained concerning a position of the source of an acquired environmental signal relative to the motor vehicle, and that an output of the warning signal occurs so that an information concerning the position of a source of the acquired environmental signal is included in the output.

9. A system for acquiring a surrounding environment of a motor vehicle, comprising:
   a computing unit; and
   at least one ultrasound sensor having an ultrasound transducer, the ultrasound transducer being configured to receive acoustic signals, and the ultrasound transducer being operated so that the ultrasound transducer sends out ultrasound signals and receives echo signals reflected by objects, and the computing unit determines items of environmental information from the received echo signals;
   wherein the at least one ultrasound sensor receives at least one of acoustic or audible environmental signals, in that the at least one ultrasound sensor is controlled in its evaluation so that at least one of sound waves or audible sound waves having frequencies below a resonant frequency of the ultrasound transducer of an environmental signal are acquired and evaluated, wherein as a function of the at least one of sound waves or audible sound waves having frequencies below the resonant frequency of the ultrasound transducer, at least one of a braking maneuver, a steering maneuver, or a change in a volume level of an audio system of the motor vehicle is triggered.

10. The system of claim 9, wherein the ultrasound transducer is operated, in a first operating state, so that the ultrasound transducer sends out the ultrasound signals and receives the echo signals reflected by the objects, and the computing unit determines the items of environmental information from the received echo signals, and wherein in a second operating state the ultrasound sensor receives acoustic and/or audible environmental signals, in that the ultrasound sensor is controlled in its evaluation so that sound waves and/or audible sound waves having frequencies below a resonant frequency of the ultrasound transducer of the environmental signal are acquired and evaluated.

11. The system of claim 9, wherein the computing unit evaluates the environmental signals through filtering of the received acoustic and/or audible environmental signals with a filtering function adapted to an expected frequency range of the environmental signal, the filtering function in particular having at least one bandpass for audible frequencies, in particular in a range from 300 to 700 Hz.

12. The system of claim 9, wherein the system for acquiring the surrounding environment is configured to produce a warning signal as a function of the evaluation of the environmental signal.

13. The system of claim 12, wherein the system for acquiring the surrounding environment includes an output unit that is configured to output the warning signal, in particular to a driver of the motor vehicle.

14. The system of claim 13, wherein the system for acquiring the surrounding environment includes at least two ultrasound sensors that are each configured to receive, in a second operating state, acoustic and/or audible environmental signals, and the computing unit is configured to evaluate the environmental signals so that an item of information is ascertained concerning a position and/or a speed and/or an acceleration and/or a type and/or a spatial orientation and/or a spatial extension of a source of the acquired environmental signal relative to the motor vehicle.

15. The system of claim 14, wherein the output unit is configured to output the warning signal, in particular to the driver of the motor vehicle, so that the warning signal includes the item of information concerning a position of the source of the acquired environmental signal relative to the motor vehicle.

16. A motor vehicle, comprising:
a system for acquiring a surrounding environment of a motor vehicle, including:
a computing unit; and
at least one ultrasound sensor having an ultrasound transducer, the ultrasound transducer being configured to receive at least one of acoustic or audible environmental signals, and the ultrasound transducer being operated so that the ultrasound transducer sends out ultrasound signals and receives echo signals reflected by objects, and the computing unit determines items of environmental information from the received echo signals;
wherein the ultrasound sensor receives the at least one of acoustic or audible environmental signals, in that the ultrasound sensor is controlled in its evaluation so that at least one of sound waves or audible sound waves having frequencies below a resonant frequency of the ultrasound transducer of an environmental signal are acquired and evaluated,
wherein as a function of the at least one of sound waves or audible sound waves having frequencies below the resonant frequency of the ultrasound transducer, at least one of a braking maneuver, a steering maneuver, or a change in a volume level of an audio system of the motor vehicle is triggered.

* * * * *